US006457876B1

(12) United States Patent
Sawai

(10) Patent No.: US 6,457,876 B1
(45) Date of Patent: Oct. 1, 2002

(54) SURFACE-MOUNTABLE OPTICAL DEVICE

(75) Inventor: Akiyoshi Sawai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/522,899

(22) Filed: Mar. 10, 2000

(30) Foreign Application Priority Data

Sep. 13, 1999 (JP) .......................................... 11-259426

(51) Int. Cl.7 ................................................. G02B 6/36
(52) U.S. Cl. ...................................................... 385/92
(58) Field of Search ............................ 385/14, 15, 31, 385/39, 40, 49, 53, 55–94

(56) References Cited

U.S. PATENT DOCUMENTS

| 6,048,106 A | * | 4/2000 | Iwase ............................ 385/59 |
| 6,135,644 A | * | 10/2000 | Hakogi et al. ................. 385/58 |
| 6,155,724 A | * | 12/2000 | Ichino et al. .................. 385/88 |
| 6,290,402 B1 | * | 9/2001 | Shishikura et al. ............ 385/88 |
| 6,309,113 B1 | * | 10/2001 | Naito ............................ 385/83 |

FOREIGN PATENT DOCUMENTS

JP 8-166523 6/1996

OTHER PUBLICATIONS

"Surface Mountable Pin–PD Module For Analog Transmission Systems," Annual Conference of IEICE, 1997, Japan (English Translation Attached).
"Surface Mount Type LD Module Using Transfer Molding," Annual Conference of IEICE, 1997, Japan (English Translation Attached).

* cited by examiner

Primary Examiner—Akm E. Ullah
Assistant Examiner—Michelle R. Connelly-Cushwa
(74) Attorney, Agent, or Firm—Burns, Doane, Swecker & Mathis, LLP

(57) ABSTRACT

A surface-mountable optical device has an optical component unit and an receptacle unit. The optical component unit has a package, inner optical components installed in the package, a plurality of surface-mountable leads protruded from the package, and a ferrule optically coupled to the inner optical components and protruded from the package in a predetermined direction. The receptacle unit has a receptacle for holding an optical fiber cable to ensure an optical coupling between the optical fiber cable and the ferrule, and a plurality of surface-mountable leads fixed on the receptacle. The surface-mountable optical device and the receptacle unit are provided independently, and also the receptacle unit is inserted into the surface-mountable optical unit along the predetermined direction.

14 Claims, 13 Drawing Sheets

SURFACE-MOUNTABLE OPTICAL DEVICE

BACKGROUND OF THE INVENTION

1. Field of the Invention

The present invention relates to an optical device that may be connected to an optical fiber cable and used in optical communication. In particular, the invention relates a surface-mountable optical device that may be mounted on a circuit board and assembled with other components.

2. Description of Related Art

Various optical devices and their peripheral components have been devised and developed heretofore for optical communication. One of such optical device and its peripheral components are shown in FIGS. 16 and 17.

FIG. 16 is a schematic plan view for illustrating a conventional optical device and its peripheral components and FIG. 17 is a schematic side view of the assembly where the optical device and its peripheral components are mounted on a circuit board 5.

In these figures, the reference numeral 28 denotes an optical device, 3 denotes an optical fiber cable comprising a cable wire 3a and a standard plug 3b, and 29 denotes an adaptor for optically coupling the optical device 28 and the optical fiber cable 3. The reference numeral 5 denotes a circuit board on which the optical device 28 is mounted. The reference numeral 30 is a device body 30 in which internal optical components (not shown) and the like are integrated. The reference numeral 31 denotes leads for securing the device body 30 on the circuit board 5 and electrically connecting the above optical components to external components (not shown). The reference numeral 32 denotes an optical cable protruded from the device body 30, and also 33 denotes a plug fixed on the tip of the optical cable 32.

The conventional optical device 28 and the peripheral components are assembled by: soldering leads 31 on the circuit board 5; and then coupling the plug 33 with the standard plug 3b through the adapter 29.

As the optical device is assembled as described above, there are several problems that lie within the step of mounting both the optical device and its peripheral components on the surface of the circuit board and also lie within their usage patterns.

Firstly, for a manufacturer, the conventional optical devices cannot be provided in quantity by automatically controlled manufacturing process because each of them has the optical fiber cable 32 that extends from the device body 30 irrespective of its length. For a user, the conventional optical device 28 cannot be mounted on the circuit board 5 simultaneously with other components. Thus each part of the optical device 28 needs to be manually mounted on the circuit board 5 after mounting the other components on the circuit board 5.

Secondary, most components currently available have surface-mountable leads. For the conventional optical device 28 described above, the number of terminals to be used in electrical contact between the optical device 28 and other components may be 8 to 20. Therefore, the leads are provided as through-hole leads in DIP (Dual Inline Package) in consideration of a strength of securing the optical device 28 on the circuit board 5 against, for example, pulling the optical fiber cable 32 accidentally. It means that there is no component that can be installed on the backside of the circuit board 5 on which the optical device 28 is mounted, standing in the way of attaining higher packing density.

Thirdly, the required number of components is considerable. The conventional optical device 28 requires a connecting means such as the adapter 29 mentioned above for connecting the optical fiber cable 32 that extends from such a device to the standard plug 3b of another cable 3 in practical use.

To solve the above problems, several approaches have been proposed so far in the step of mounting an optical device and its peripheral components on a circuit board and the usage pattern thereof. FIG. 18 is a schematic plan view for illustrating the construction of another conventional optical device (hereinafter, referred as a second conventional optical device) and its peripheral components.

In the figure, the reference numeral 34 denotes a ferrule protruding from one end of the device body 30 in which an optical fiber (not shown) is coaxially provided. The reference numeral 35 denotes an optical fiber cable designed specifically for the device body 30. The optical fiber cable 35 comprises a cable wire 36, a ferrule 37, and a plug 38. The reference numeral 39 denotes a sleeve for positioning the ferrule 37 of the specific optical cable 35 and the ferrule 34 of the device body 30 together with great precision. The reference numeral 29 denotes an adaptor for optically coupling between the plug 38 and the standard plug 3b.

In addition, the reference numeral 41 denotes a female connector fixed on the device body 30, and 42 denotes a male connector which is provided around the ferrule 37.

Accordingly, the optical device and its peripheral components are constructed as described above, so that the optical device can be configured in which the optical fiber cable 35 extends from the surface of the device body 30 by mounting the device body 30 on a circuit board (not shown in FIG. 18) and then coupling the connectors 41, 42 together through the sleeve 39.

The second conventional optical device is designed so that the optical fiber cable 35 does not extend from the device body 30 in itself. Thus, the device body 30 can be automatically mounted on the substrate 5 together with other components by means of batch reflowing.

In spite of the improved configuration of the second conventional optical device, a sufficient strength securing the device 28 on the circuit board 5 against an externally applied force caused by mating and unmating of the optical fiber cable 3 cannot be ensured. Notably, an insufficient securing strength becomes increasingly serious if surface-mountable leads are used. Thus, the second conventional optical device requires through-hole leads. In this case, however, it stands in the way of attaining simultaneous mounting with other components and higher packing density.

Furthermore, the second conventional optical device cannot attain a sufficient securing strength against an externally applied force caused by directly mating and unmating the standard plug 3b of the optical fiber cable 3 with the optical device. Thus, the device body 30 should be connected to the specific optical fiber cable 35, followed by connecting such a cable 35 to the standard plug 3b of the optical fiber cable 3. As a result, the number of components required increases considerably.

SUMMARY OF THE INVENTION

Therefore, an object of the present invention is to provide a surface-mountable optical device which can be installed on a circuit board simultaneously with other components by means of surface-mount technology and directly connecting to a standard plug of an optical fiber cable for simultaneously attaining the reduction in component count and an increased packaging density.

In the first aspect of the invention, there is provided a surface-mountable optical device comprising:

an optical component unit having a package, an inner optical components installed in the package, a plurality of surface-mountable leads protruded from the package, and a ferrule optically coupled to the inner optical components and protruded from the package in a predetermined direction; and a receptacle unit having a receptacle for holding an optical fiber cable to ensure an optical coupling between the optical fiber cable and the ferrule, and a plurality of surface-mountable leads fixed on the receptacle, wherein the surface-mountable optical device and the receptacle unit are provided independently, and the receptacle unit is inserted into the surface-mountable optical unit along the predetermined direction.

Here, the receptacle unit may be formed to ensure the optical coupling between the optical fiber cable and the ferrule when a space between an outermost surface-mountable lead of the optical component unit on the ferrule side and an outermost surface-mountable lead of the receptacle unit on the optical component unit side, which are adjacent to each other, is an integral multiple of a space between the adjacent surface-mountable leads of the optical component unit.

A width of the surface mountable lead of the receptacle units may be larger than a width of the surface mountable lead of the optical component unit.

A length of the surface mountable lead of the receptacle units may be smaller than a length of the surface mountable lead of the optical component unit.

The optical component unit may further comprise at least one guide portion formed from a molding resin and protruded therefrom in the direction coincided with the predetermined direction, for moving the receptacle unit along the guide portion to make an insertion of the receptacle unit into the optical component.

The optical component unit may further comprise at least one guide portion formed from the lead frame and provided thereon in the direction parallel to the predetermined direction, and the receptacle unit may further comprise at least one slit to be fit to the guide portion.

One of the optical component unit and the receptacle unit may have at least one recess or through hole being opened in a direction perpendicular to a predetermined direction, while the other of the optical component unit and the receptacle unit may have at least one protrusion at a position facing to the recess or through hole when the receptacle unit is inserted into the optical component unit.

In a second aspect of the present invention, there is provided a surface-mountable optical device assembly comprising:

a surface-mountable optical device, a circuit board on which the surface-mountable optical device is mounted, and an optical fiber to be optically connected to the surface-mountable optical device, wherein the surface-mountable optical device is comprised of:

an optical component unit having a package, inner optical components installed in the package, a plurality of surface-mountable leads protruded from the package, and a ferrule optically coupled to the inner optical components and protruded from the package in a predetermined direction; and a receptacle unit having a receptacle for holding an optical fiber cable to ensure an optical coupling between the optical fiber cable and the ferrule, and a plurality of surface-mountable leads fixed on the receptacle, wherein the surface-mountable optical device and the receptacle unit are provided independently, and the receptacle unit is inserted into the surface-mountable optical unit along the predetermined direction.

BRIEF DESCRIPTION OF THE DRAWINGS

The above and other objects, effects, features and advantages of the present invention will become more apparent from the following description taken in connection with the accompanying drawings wherein like parts in each of the drawings are identified by the same reference character and wherein.

DETAILED DESCRIPTION OF PREFERRED EMBODIMENTS

Hereinafter, preferred embodiments of the present invention will be described in detail.

First Preferred Embodiment

Figure 1:
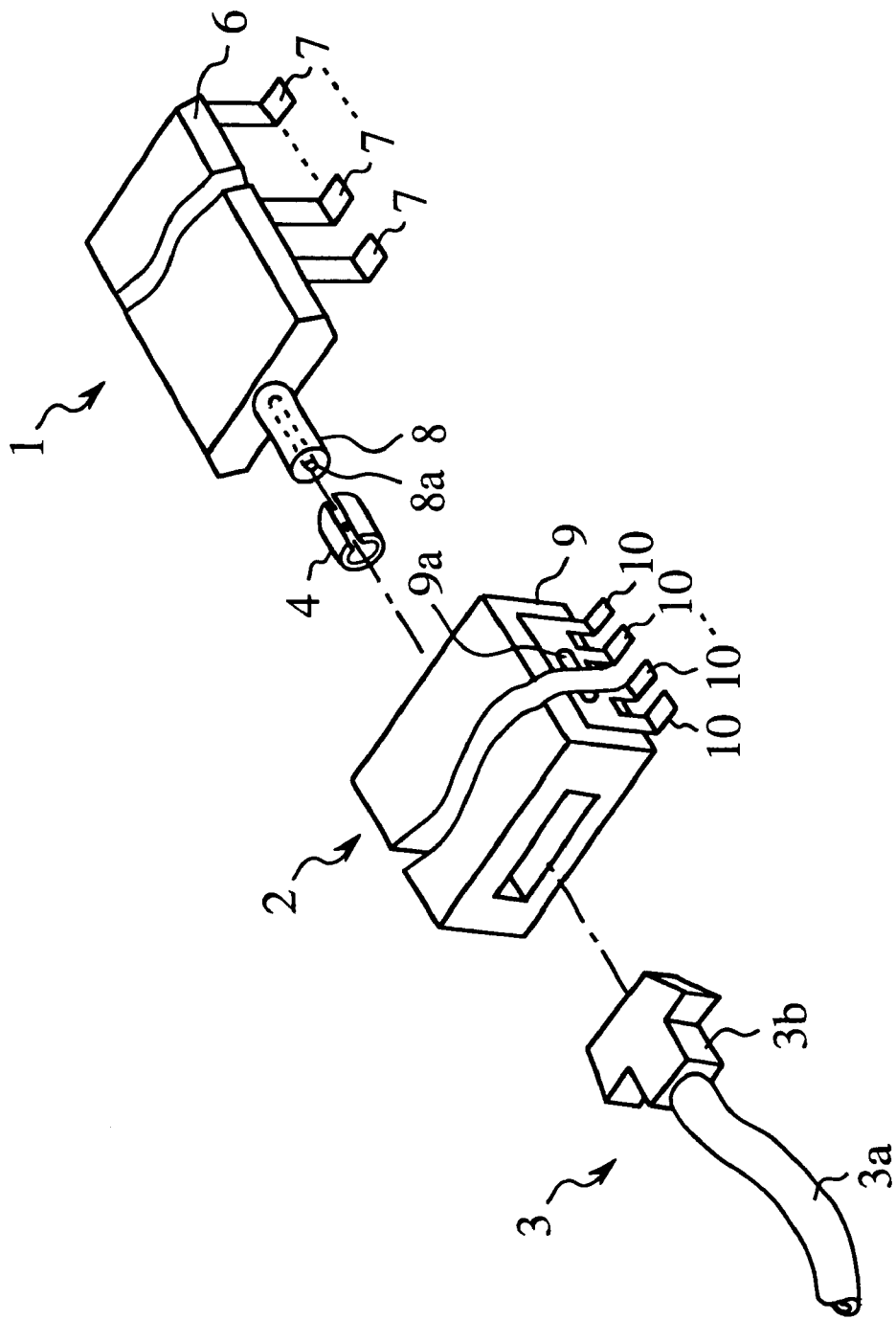
FIG. 1 is an exploded perspective view of a surface-mountable optical device as the preferred embodiment of the present invention.
Figure 2:
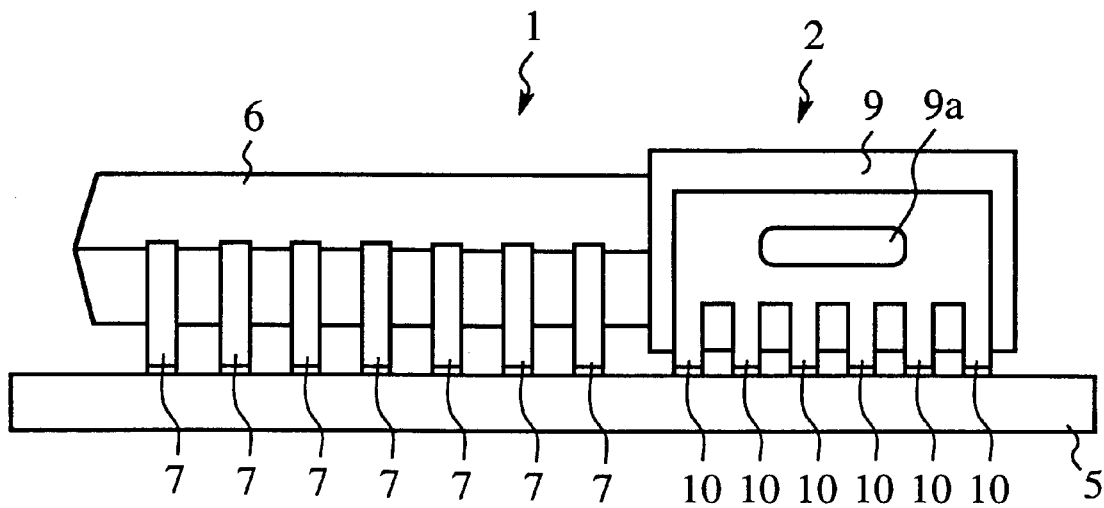
FIG. 2 is a schematic side view for illustrating an arrangement of components in which the surface-mountable optical device of the first preferred embodiment is mounted on a circuit board.
Figure 3:
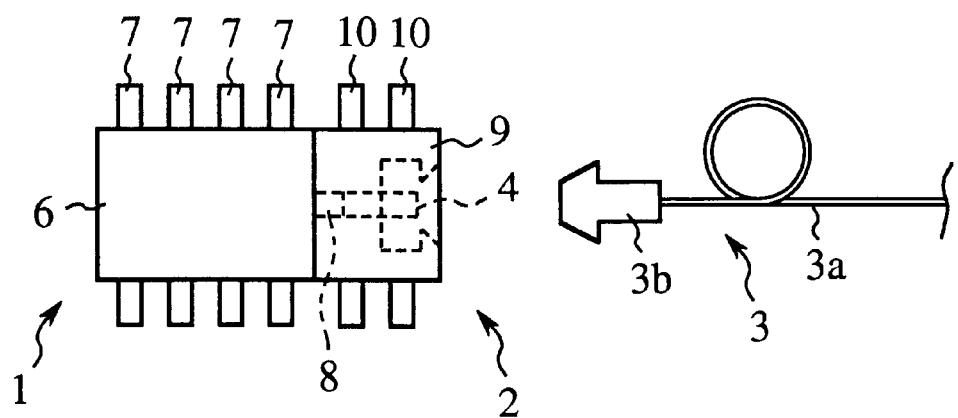
FIG. 3 is a plan view for illustrating how to connect an optical fiber cable to the surface-mountable optical device.

Referring now to the drawings, a first preferred embodiment of the present invention will be described in detail. FIG. 1 is an exploded perspective view of a surface-mountable optical device as the first preferred embodiment of the present invention, FIG. 2 is a schematic side view for illustrating an arrangement of components in which the surface-mountable optical device of the first preferred embodiment is mounted on a circuit board, and FIG. 3 is a plan view for illustrating how to connect an optical fiber cable to the surface-mounted optical device.

In these figures, the reference numeral 1 denotes an optical component unit provided as a molded package of a hybrid packaging design that comprises various inner optical components and semiconductor elements. The reference numeral 2 denotes a receptacle which is manufactured independently of the manufacture of the optical component unit 1. The reference numeral 3 denotes an optical cable comprising a cable. wire 3a where both ends thereof are respectively connected to standard plugs 3b, 4 denotes a slit sleeve, and 5 denotes a circuit board on which a surface-mountable optical device is mounted.

In the optical component unit 1, the reference numeral 6 denotes a molded package (hereinafter, simply referred as to a package) of an approximately rectangle in form, 7 denotes a plurality of leads 7 protruded from both longitudinal sides of the package 6, and 8 denotes a ferrule made of zirconium, glass or the like and protruded from one end of the package 6 along the direction of the width. In the optical component unit 1, furthermore, the molded package 6 comprises: various inner optical components such as a photo diode (PD), a planner light-wave circuit (PLC), and an optical fiber; and semiconductor elements such as a preamp IC for driving a laser diode (LD). These components are assembled in the optical component unit 1 using joint means such as resins,. metallic solder connections and metallic fine lines. The above optical components are optically coupled to the optical fiber 8a concentrically arranged in the ferrule 8.

In the receptacle unit 2, the reference numeral 9 denotes a receptacle for holding the standard plug 3b of the optical fiber cable 3 to ensure an optical coupling between the ferrule 8 and the standard plug 3b.

The reference numeral 10 denotes a plurality of surface-mountable leads fixed on longitudinal sides of the receptacle 9. The surface-mountable lead 10 of the receptacle unit 2 may be in the shape of the letter "L" or "a gull-wing" and firmly affixed to the receptacle 9 in the process of manufacturing the receptacle unit 2. As shown in FIGS. 1 and 2, the leads 10 are provided as a plate having a plurality of lead portions and a hole being engaged with a protruded portion 9a made of resin or; the like on the side of the receptacle 9.

The optical device can be assembled as follows.

Firstly, the ferrule 8 of the optical component unit 1 is inserted into the receptacle 9 to combine two units 1, 2 together. These units 1, 2 may be united together by means of mechanical parts or adhesive.

It is noted that the combination should be constructed so that a sufficient optical coupling between the standard plug 3b and the ferrule 8 will be attained. In general, therefore, the slit sleeve 4 made of zirconium or phosphor bronze may be used to place two fibers (i.e., the optical fiber 8a in the ferrule 8 and the optical fiber (not shown) in the standard plug 3b) in concentric alignment with very high precision. A slit sleeve 4 may be placed in the interior of the receptacle 9 in advance. In this case, for example, the slit sleeve 4 may be inserted into a metallic sleeve holder through which the slit sleeve 4 is held in the receptacle 9.

Secondary, as shown in FIG. 2, the obtained assembly of the optical component unit 1 and the receptacle unit 2 is surface-mounted on a circuit board 5. According to the first preferred embodiment, these units 1, 2 are identical with respect to their shapes for surface-mount, so that they can be subjected to a reflow surface-mount technology in a state of being combined together. In the reflow surface-mount technology, all of the surface-mountable leads are soldered to the surface of the circuit board 5. For subjecting the combination of the units 1, 2 to the reflow surface-mount technology, it is preferable that the tip of each lead is positioned at a distance of 0.05 mm or over from the underside of the corresponding unit in a vertical direction. In addition, it is preferable that a flatness of each of the leads 7, 10 (i.e., variations in the positions of lead tips in a vertical direction) is 0.1 mm or less in terms of surface-mounting ability with respect to a wet ability of solder.

Finally, the standard plug 3b of the optical fiber cable 3 is inserted into the receptacle 9 on the circuit board 5. As a result, an optical coupling between the optical fiber cable 3 and the ferrule 8 is attained, so that data exchange using light passing through the optical fiber cable 3 can be carried out.

The surface-mountable leads 7 of the optical component unit 1 are responsible for transmission and reception of electrical signals, so that they should be designed for a high degree of long-term reliability of the connection to the board 5. On the other hand, the leads 10 of the receptacle unit 2 have the function of only connecting the unit 2 to the board 5 and they do not contribute to transmission and reception of electrical signals. It means that the leads 10 are provided for the purpose of reducing external force to be applied on the leads 7 of the optical component unit 1 during the steps of mating and unmating the standard plug 3b of the optical fiber cable 3 with the combination of units 1,2. For that reason, an, area of the lead 10 that comes in contact with the surface of the unit 2 may be enlarged as much as possible.

According to the first preferred embodiment, as described above, the surface-mountable optical device comprising:

an optical component unit 1 having a molded package 6, inner optical components installed in the molded package 6, a plurality of surface-mountable leads 7 protruded from the molded package 6, and a ferrule 8 optically coupled to the inner optical components and protruded from the molded package 6 in a predetermined direction; and a receptacle unit 9 having a receptacle 9 for holding an optical fiber cable 3 to ensure an optical coupling between the optical fiber cable 3 and the ferrule 8, and a plurality of surface-mountable leads 10 fixed on the receptacle 9, wherein the optical component unit 1 and the receptacle unit 2 are independently manufactured. Therefore, the surface-mountable optical device can be used by connecting the standard plug 3b of the optical cable 3 into the receptacle 9 to the predetermined direction.

In this case, furthermore, the standard plug 3b of optical fiber cable 3 is connected in itself can be fixed on the circuit board 5. Also, the surface-mountable leads 10 of the receptacle unit 2 are provided for the purpose of only tightly securing the receptacle unit 2 on the circuit board 5. Therefore, a strength of securing the receptacle unit on the circuit board is sufficient to withstand an externally applied force or stress caused by mating or unmating of the standard plug of the optical fiber cable.

Simultaneously with the formation of the receptacle unit, the optical components and the ferrule 8 are formed on the optical component unit's side in addition to the formation of the optical component unit 1 independently of that of the receptacle unit 2, so that the surface-mountable leads 7 that require predetermined electric properties are provided on the optical component unit 1 as optical components and the ferrule are installed on the optical component unit. Thus, the electrical connection between the unit and the board shows the same electrical properties as those of the conventional one.

According to the configuration of the conventional optical device in which the optical components and the receptacle are integrally assembled, the optical device cannot be connected directly to the standard plug of the optical fiber together with the use of the surface-mountable leads. According to the present Invention, however, such a problem can be solved. With the construction of the surface-mounting optical device, therefore, the surface-mountable leads 7, 10 are used for improving the density of components mounted on the circuit board 5 simultaneously with the automatic mounting of both the optical device and other components on the circuit board 5 at once by the process of reflow. In this case, it is noted that the standard plug 3b of the optical cable 3 can be directly connected to the receptacle unit 2 even though the optical device is fixed on the circuit board 5, resulting that the number of components to be required can be reduced.

In this embodiment, by the way, the surface-mountable leads 10 are fixed on the receptacle unit 2 by means of the protruded portion 9a formed on the side of the receptacle 9. However, it is not limited to such a configuration. A man ordinary skilled in the art will be easily find another way to provide leads 10 on the side of the receptacle unit 2.

Second Preferred Embodiment

Figure 4:
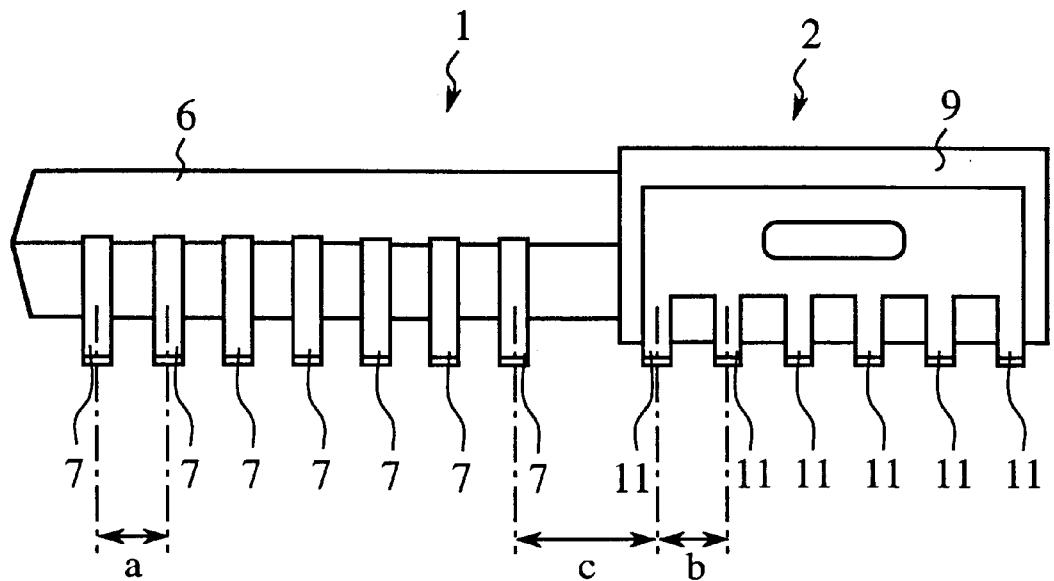
FIG. 4 is a schematic side view of a surface-mountable optical device as a second preferred embodiment of the present invention.

FIG. 4 is a schematic side view of a surface-mountable optical device as a second preferred embodiment of the present invention. In this embodiment, an optical device comprises the same units and components as those of the first preferred embodiment except of the follows.

Reference numeral 11 denotes each of surface-mountable leads. The spacing (indicated by the arrow "b") between adjacent leads 11 of the receptacle 2 is an integral multiple of the spacing (indicated by the arrow "a") of leads 7 of the optical component unit 1. When two units 1, 2 are combined together to ensure an optical coupling between the optical fiber cable 3 and the ferrule 8, the spacing (indicated by the arrow "c") between a lead 11 and a lead 7 which are adjacent to each other is also integral multiple of that of the leads 7 of the optical component unit 1. Therefore, the surface-mountable leads 11 are provided so as to satisfy the relationship among them as indicated by the following equation.

$b=na, c=ma$ ("m" and "n" are integral numbers)

In this embodiment, furthermore, a width of the lead 7 equals that of the lead 11.

Accordingly, the receptacle unit 2 is formed so that an optical coupling between the optical fiber cable 3 and the ferrule 8 is ensured when a pitch of adjacent leads 11 is an integral multiple of a pitch of adjacent leads 7.

Thus, a design engineer will easily design a surface-mount pattern of leads 11 of the receptacle unit 2 using general rules for designing leads 7 of the optical component unit 1 or the like. Thus, the optical device of the present embodiment can be obtained by performing a design for surface-mounting the receptacle unit 2 using the same rules as those of the design for other units or components without using specific design rules.

Third Preferred Embodiment

Figure 5:
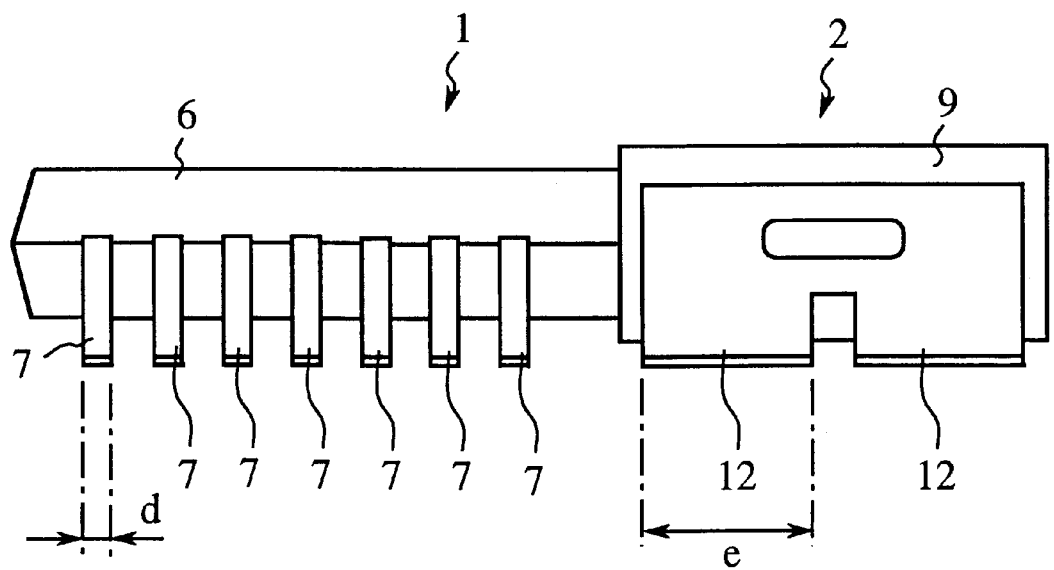
FIG. 5 is a schematic side view of a surface-mountable optical device as a third preferred embodiment of the present invention.

FIG. 5 is a schematic side view of a surface-mountable optical device as a third preferred embodiment of the present invention. In this embodiment, an optical device comprises the same units and components as those of the first preferred embodiment except of the follows.

In this embodiment, as shown in the figure, a width (indicated by the arrow "e") of lead 12 is much larger than a width (indicated by the arrow "d") of lead 7 and is approximately equal to an entire set of leads 11 of the second preferred embodiment as a unit.

In this embodiment, therefore, such a configuration enables a lead frame used in the optical component unit 1 or the like to be used for preparing leads 12 and for firmly securing the receptacle unit 2 on the circuit board 5.

Consequently, a strength of securing the receptacle unit 2 on the circuit board 5 can be increased and produces the effect of decreasing externally applied force or stress that acts on the leads 7 of the optical component unit at the time of mating or unmating of the standard plug 3b of the optical fiber cable 3.

Fourth Preferred Embodiment

Figure 6:
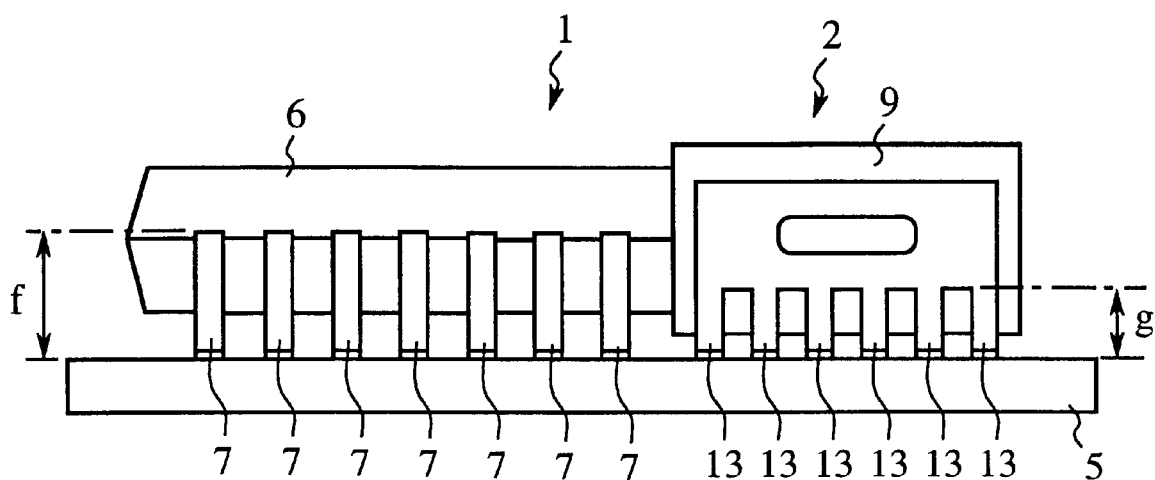
FIG. 6 is a schematic side view of a surface-mountable optical device as a fourth preferred embodiment of the present invention.

FIG. 6 is a schematic side view of a surface-mountable optical device as a fourth preferred embodiment of the present invention. In this embodiment, an optical device comprises the same units and components as those of the first preferred embodiment except of the follows.

In this embodiment, surface-mount leads 13 of the receptacle unit 2 are equal to or shorter than the leads 7 of the optical component unit 1 so as to satisfy the equation of $g \leq f,$ where "g" denotes a length of lead 13 and "f" denotes a length of lead 7.

According to the fourth preferred embodiment, as described above, the surface-mount lead 13 of the receptacle unit 2 is shorter than the surface-mount lead 7 of the optical component unit 1, so that a lead frame used in the optical component unit 1 or the like can be used for preparing leads 13 and for firmly securing the receptacle unit 2 on the circuit board 5.

The receptacle unit 2 and the optical unit 1 tend to shift their positions by externally applied force at the time of mating or unmating of the standard plug 3b of the optical fiber cable 3 after surface-mounting the optical device on the circuit board 5. In this case, however, the stress that acts on the connected portion of the board 5 may be small, enough to make the connection more reliable because the surface-mount leads 7 of the optical component unit 1 is longer than the surface-mount leads 13 of the receptacle unit 2.

Fifth Preferred Embodiment

Figure 8:
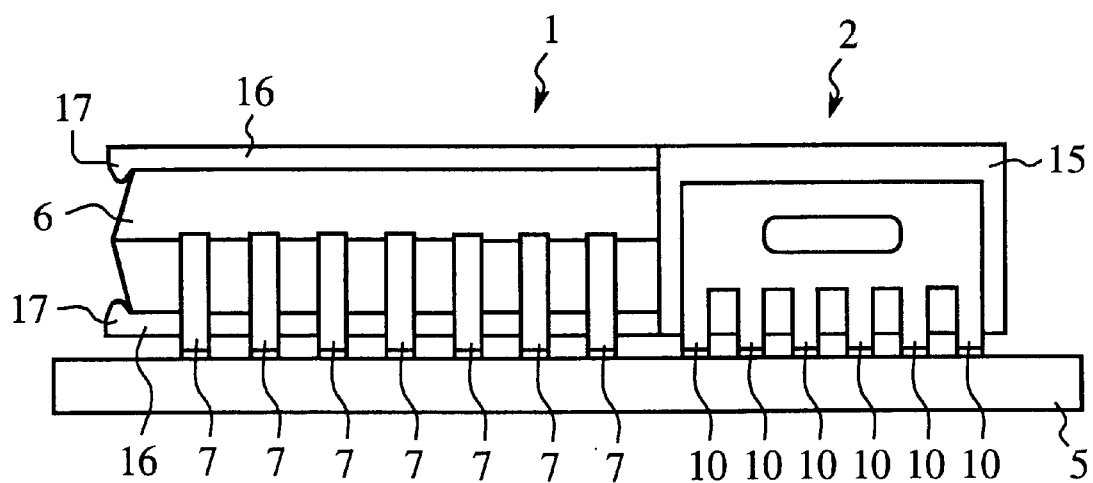
FIG. 8 is a schematic side view of the surface-mountable optical device as a preferred embodiment of the present invention.
Figure 7:
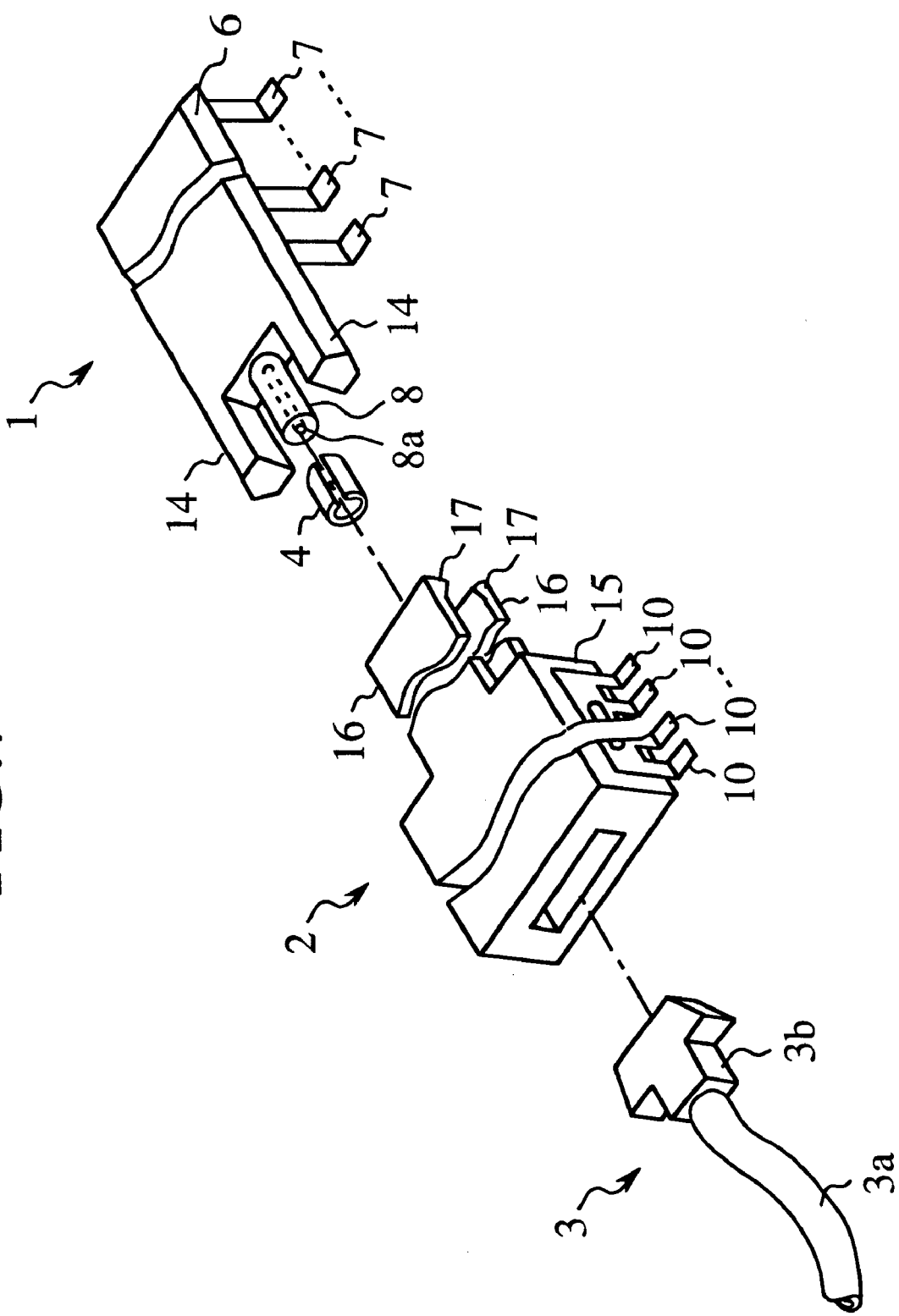
FIG. 7 is a partially exploded perspective view of a surface-mountable optical device as a fifth preferred embodiment of the present invention.

FIG. 7 is a partially exploded perspective view of a surface-mountable optical device as a fifth preferred embodiment of the present invention. FIG. 8 is a schematic side view of the surface-mountable optical device of FIG. 7 being mounted on a circuit board 5. In this embodiment, an optical device comprises the same units and components as those of the first preferred embodiment except of the follows.

As shown in the figure, two posts (i.e., guide portions) 14 made of molding resin are protruded from the end of an optical component unit 1 on which a ferrule 8 is also protruded in parallel with the posts 14. On the other hand, a receptacle unit 2 comprises a receptacle 15 and two parallel guide plates 16. The receptacle 15 has one end with the internal diameter thereof that permits an insertion of the posts 14 and the other end that holds a standard plug 3b of an optical fiber cable 3 to ensure an optical coupling between the standard plug 3b and the ferrule 8. The guide plates 16 are protruded from the post-inserting side of the receptacle 1 and parallel to each other. Each of the guide plates 16 is longer than a length of the optical component unit 1 in the direction of the length of the unit 1, and also they have hooks on their top ends, respectively. As shown in the figure, the hooks 17 are inwardly formed so as to face to each other.

The optical device having the above components can be assembled as follows.

Firstly, a slit sleeve 4 is placed on the ferrule 8. Then, the ferrule 8 and two posts 14 are inserted into the inside of the receptacle 15 concurrently with making sure that two posts 14 are introduced into the right place in the receptacle 15. Subsequently, they are inserted until the hooks 17 catch the other end of the optical component unit 1, resulting in a combination between the optical component unit 1 and the receptacle unit 2. Accordingly, the posts 14 act as insertion guides and prevent distortion, pinch, turn and the like of the slit sleeve 4.

It is preferable to mold the posts 14 so that a clearance between the posts 14 and the receptacle 15 is 0.2 mm or less. In addition, it is preferable that each of the posts 14 has a width of 0.5 mm or more, a thickness of 0.5 mm or more, and a length of 7 mm or less when the posts 14 are molded concurrently with molding the package 6.

The above posts 14 also act as protective members of the ferrule 8 when the optical component unit 1 is dropped to the ground by mistake.

Further details of the process of assembling the optical device are similar to those of the first preferred embodiment, so that the explanation is omitted.

According to the present embodiment, as described above, the posts 14 are intended to guide the receptacle unit 2 into the optical component unit 1, so that the position of receptacle unit 2 is restricted and stabilized during the insertion into the optical component unit 1. Thus, the posts 14 are responsible for effectively avoiding scratches on the surface of ferrule 8 caused by the insertion of receptacle unit 2 or by other operations.

After the insertion, a relative-position error between the receptacle unit 2 and the optical component unit 1 can be reduced, so that the ferrule 8 can be optically coupled to the optical fiber cable 3 with very high precision. Therefore, optical properties of the optical device can be improved.

Before the insertion of the receptacle unit 2, furthermore, the above posts 14 also act as protective members of the ferrule 8 when the optical component unit 1 is dropped to the ground by mistake.

Figure 9:
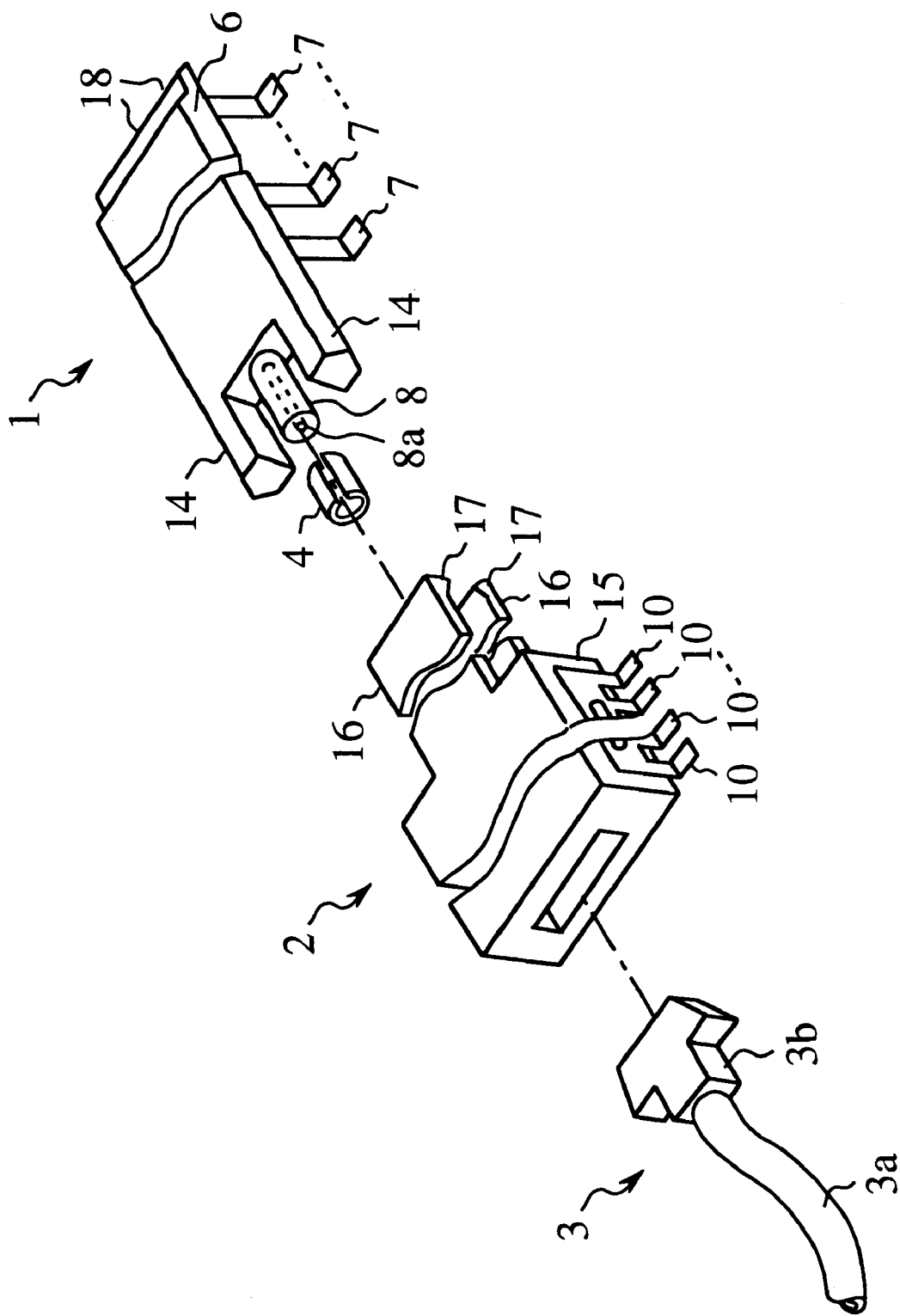
FIG. 9 is a partially exploded perspective view of a surface-mountable. optical device as a first modification of the fifth preferred embodiment of the present invention.
Figure 10:
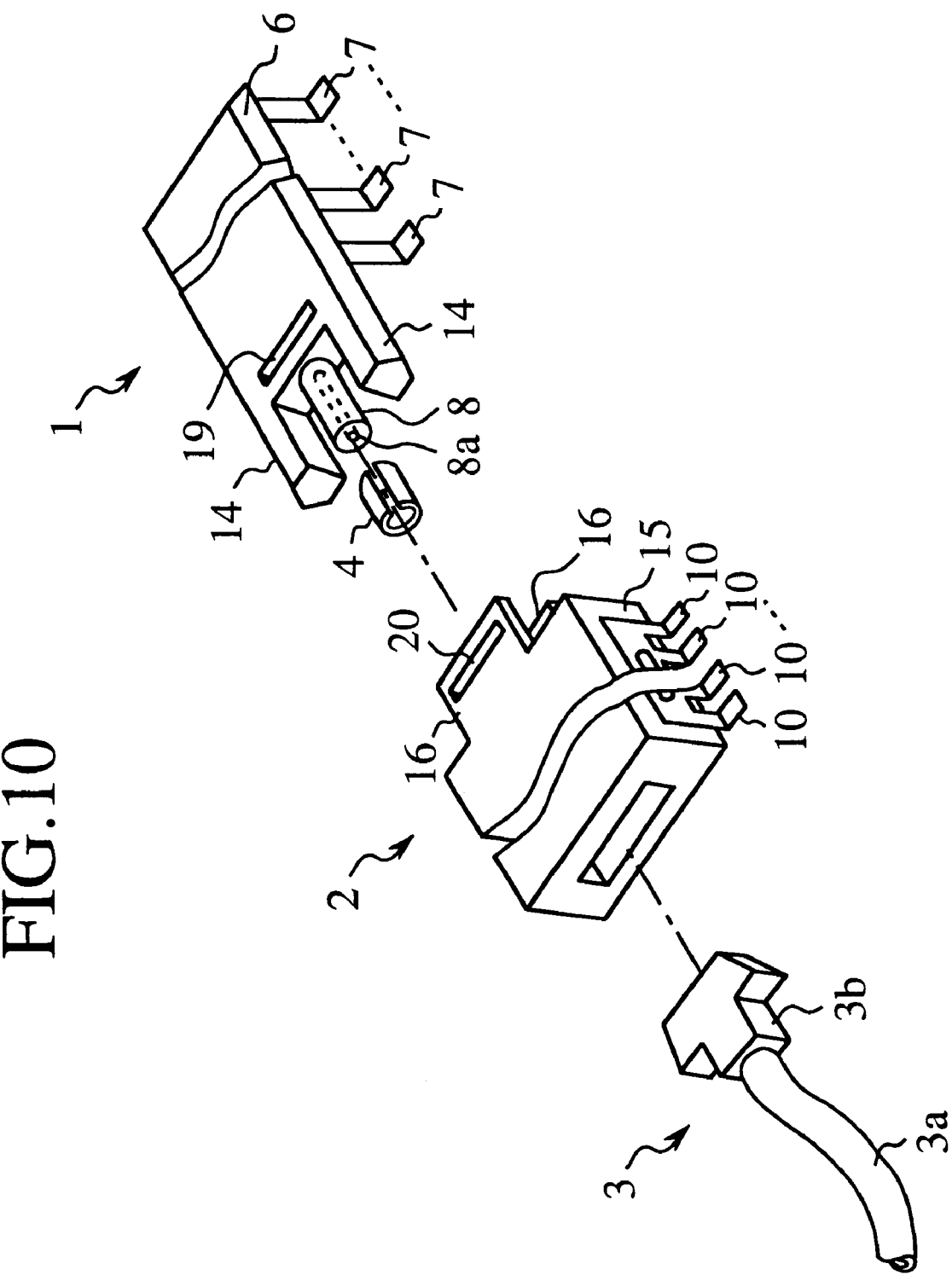
FIG. 10 is a partially exploded perspective view of a surface-mountable optical device as a second modification of the fifth preferred embodiment of the present invention.

The present embodiment can be modified as shown in FIGS. 9 and 10. FIGS. 9 and 10 are partially exploded perspective views of surface-mountable optical devices as first and second modifications of the fifth preferred embodiment of the present invention, respectively. In these cases, posts 14 act as guide members for inserting the ferrule 8 into the receptacle unit 2. In these figures, the reference numeral 18 denotes recesses formed on an end of the molded package 6 opposite to the ferrule's side so that the hooks 17 are respectively engaged in the recesses 18 when two units 1, 2 are combined together. The reference numeral 19 denotes protruded portions respectively formed on top and bottom surfaces of the molded package 6. The reference numeral 20 denotes slits formed on a guide plate 16. The protruded portions are fit to the slits 20 when two units 1, 2 are combined together.

Sixth Preferred Embodiment

Figure 11:
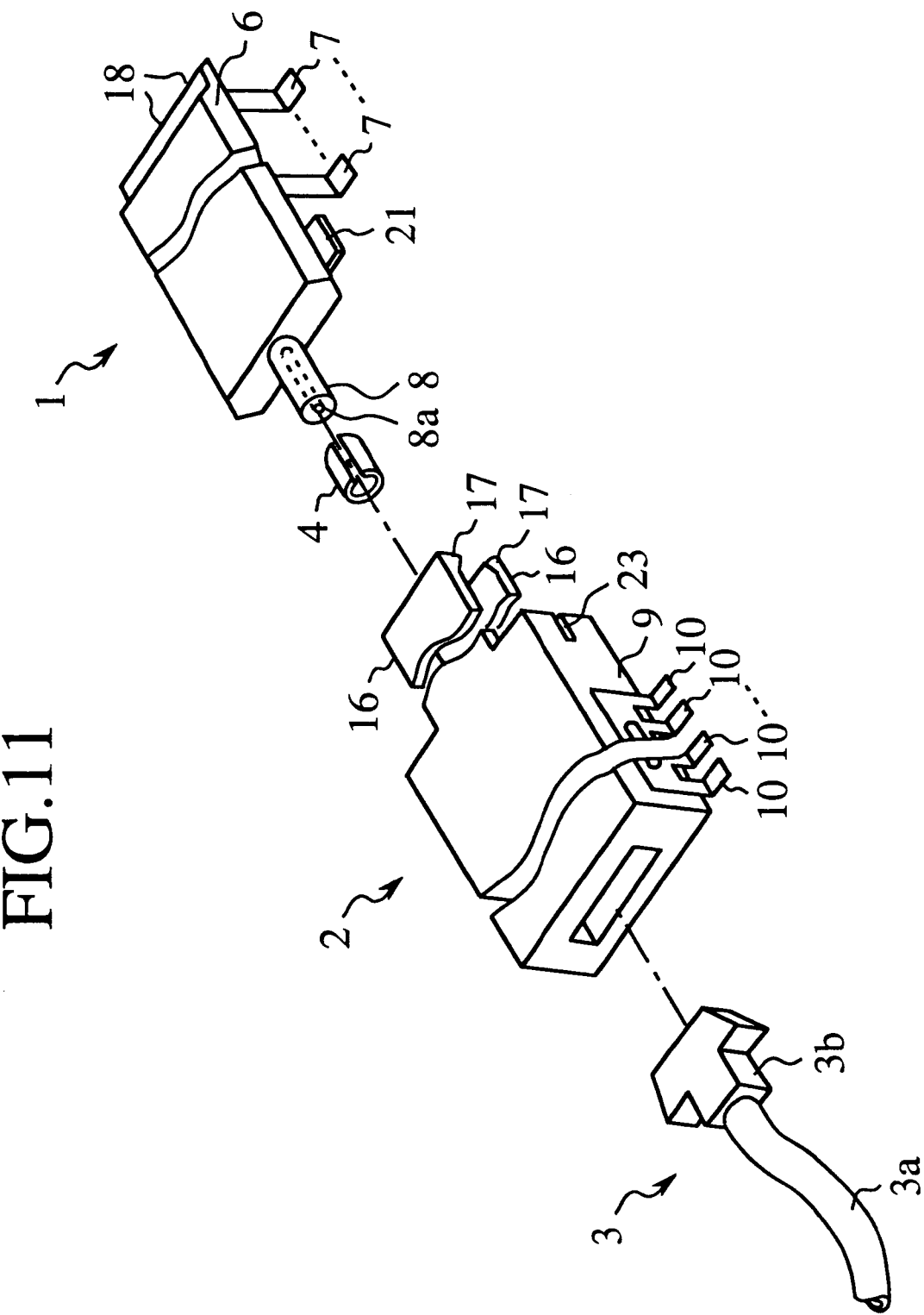
FIG. 11 is a partially exploded perspective view of a surface-mountable optical device as a sixth preferred embodiment of the present invention.
Figure 12:
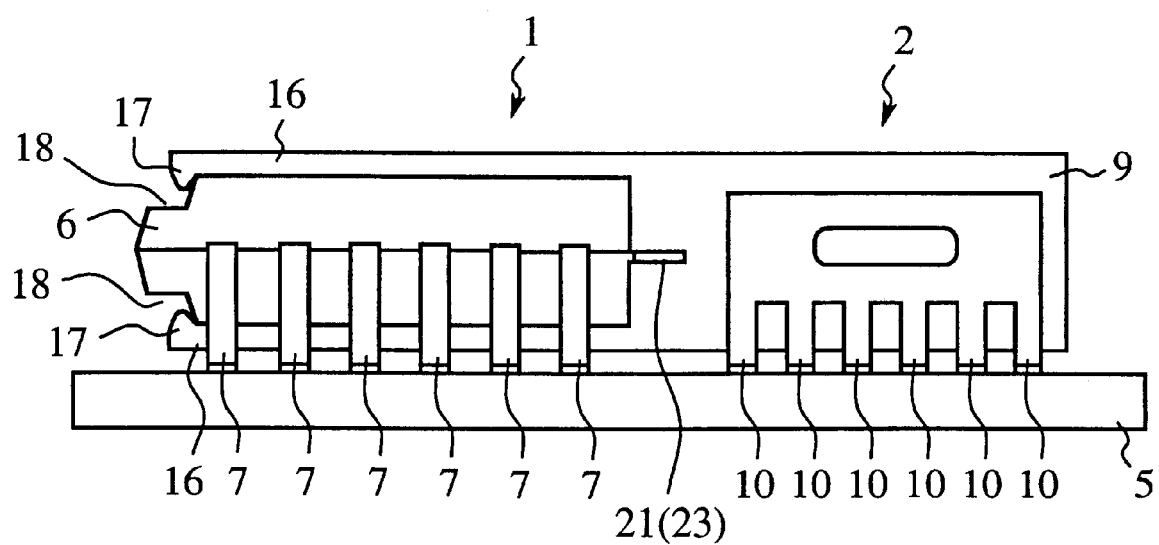
FIG. 12 is a schematic side view of the surface-mountable optical device of FIG. 11 being mounted on a circuit board.

FIG. 11 is a partially exploded perspective view of a surface-mountable optical device as a sixth preferred embodiment of the present invention. FIG. 12 is a schematic side view of the surface-mountable optical device of FIG. 11 being mounted on a circuit board 5. In this embodiment, an optical device comprises the same units and components as those of the optical devices shown in FIGS. 9 and 10 except of the follows. Further details of the process of assembling the. optical device are similar to those of the fifth preferred embodiment, so that the explanation is omitted.

As shown in the figures, the reference numeral 21 denotes flanges (guide portions) which are respectively protruded from both longitudinal sides of a molded package 6 in the direction perpendicular to a ferrule 8 and positioned in proximity to the ferrule's side. On the other hand, the reference numeral 23 denotes slits (grooves) formed on an end portion of the receptacle 9 where the ferrule 8 is inserted so as to be fit to the above flanges 21 when the units 1, 2 are combined together.

In this embodiment, by the way, the above flanges 21 may be previously patterned in a state of frame or die-cut at the time of forming surface-mountable leads.

According to present embodiment, as described above, the optical component unit 1 has the flanges 21 provided in the direction parallel to the protruded direction of the ferrule 8 and the receptacle unit 2 has slits 23 to be fit to the above flanges 21. Thus, the flanges 21 are intended to guide the ferrule 8 into the receptacle unit 2, so that the position of receptacle unit 2 is restricted and stabilized during the insertion of ferrule 8. Thus, the flanges 21 are responsible for effectively. avoiding scratches on the surface of ferrule 8 to be caused by the step of inserting the ferrule 8 into the receptacle unit 2 or by other steps.

After the insertion, a relative-position error between the receptacle unit 2 and the optical component unit 1 can be reduced, so that the ferrule 8 can be optically coupled to the optical fiber cable 3 with very high precision. Therefore, optical properties of the optical device can be improved.

It is noted that a warp in the post 14 formed by a molding resin may be caused by uneven thermal or hardened shrinkage, or changes in dimension of the post 14 may be also caused by such shrinkage. In this embodiment, flanges 21 are formed from a lead frame in addition to surface-mount leads 7 and the like, so that a warp in the flange 21 is unlikely to be caused by uneven thermal or hardened shrinkage. Changes in dimension of the flange 21 are also unlikely to be caused by such a shrinkage, compared with those of the guide portion formed as a part of the resin-molded package 6. Therefore, the present embodiment enhances the effects described above. In this case, the position where the flange 21 is formed at the time of forming leads is not bent. To provide functional flanges 21 as described above, the flange 21 may be formed as one having a width of 1 mm or less and a length of 3 mm or less. A thickness of the flange 21 depends on a thickness of the lead frame, so that it may be typically in the range of 0.125 to 0.25 mm.

Figure 13:
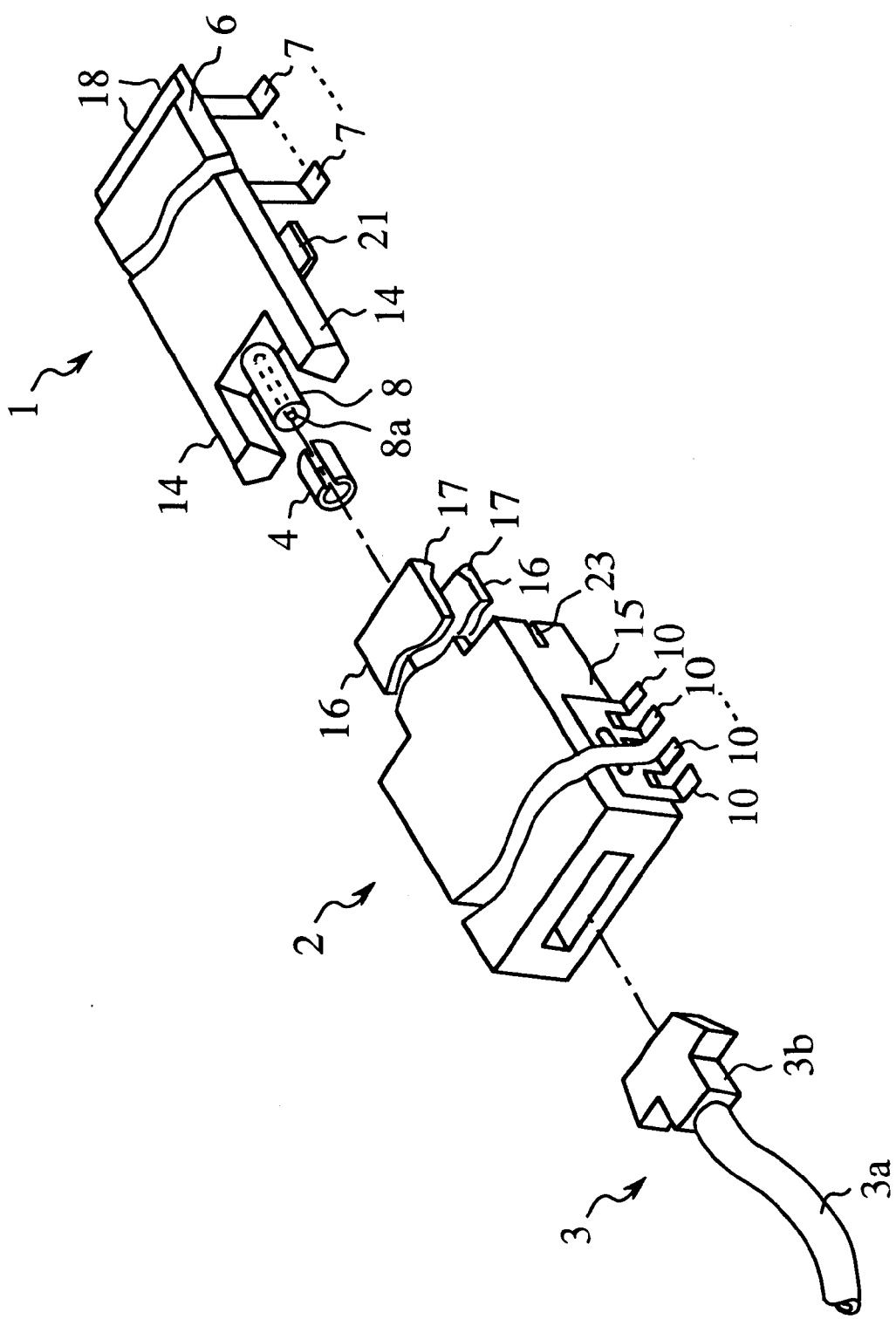
FIG. 13 is a partially exploded perspective view of a surface-mountable optical device as a modification of the sixth preferred embodiment of the present invention.

A modification may be made to the present embodiment, for example, as shown in FIG. 13. In this figure, posts 14 are further provided on the molded package 6 in addition to the flanges 21.

Seventh Preferred Embodiment

Figure 14:
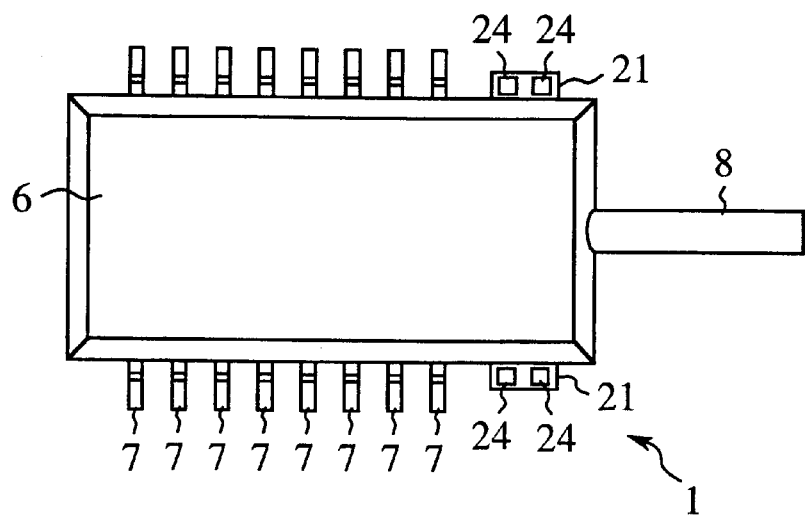
FIG. 14 is a top view of an optical component unit 1 used in an optical device as a seventh preferred embodiment of the present invention.
Figure 15:
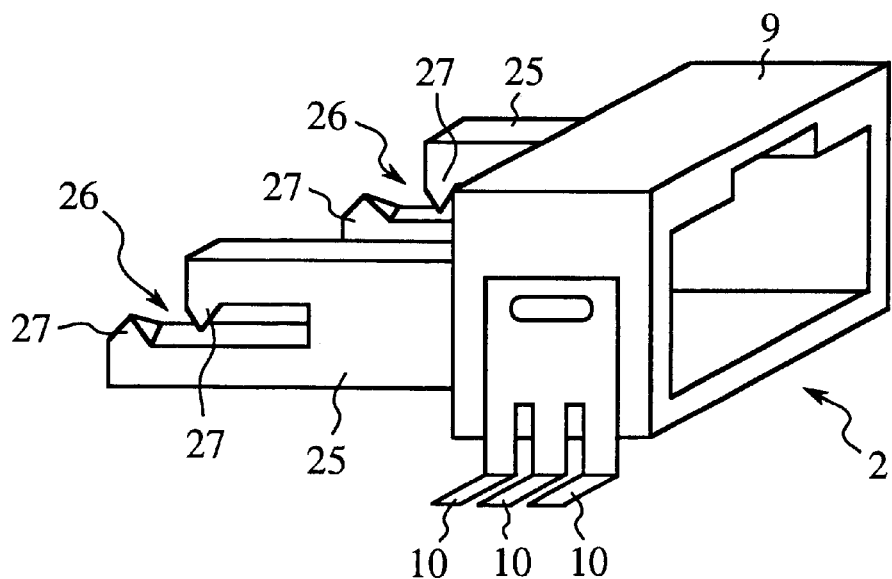
FIG. 15 is a perspective view of a receptacle unit 2 to be combined with the optical component unit 1 shown in FIG. 14.
Figure 16:
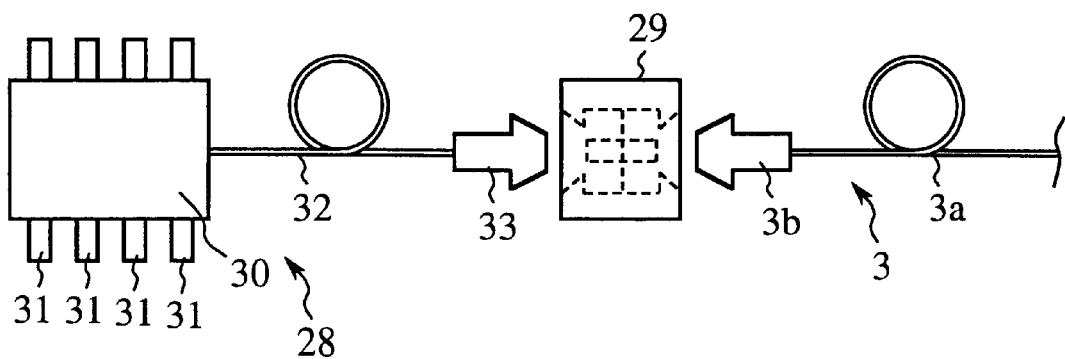
FIG. 16 is a schematic plan view for illustrating a conventional optical device and its peripheral components.
Figure 17:
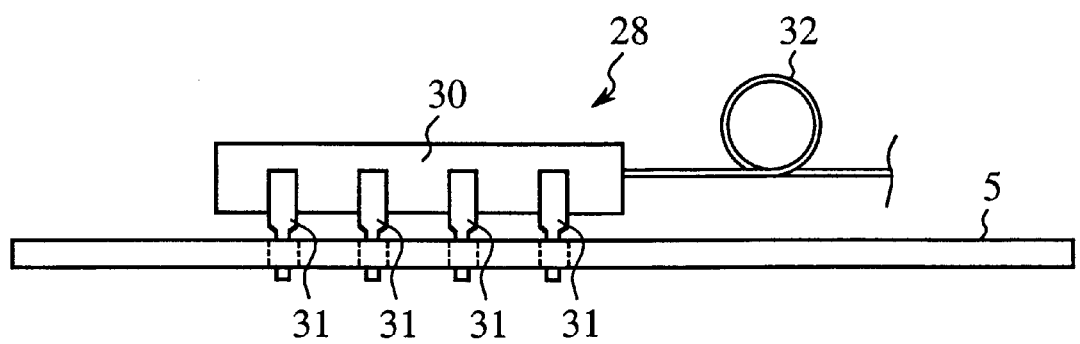
FIG. 17 is a schematic side view of the assembly where the optical device and its peripheral components are mounted on a circuit board.
Figure 18:
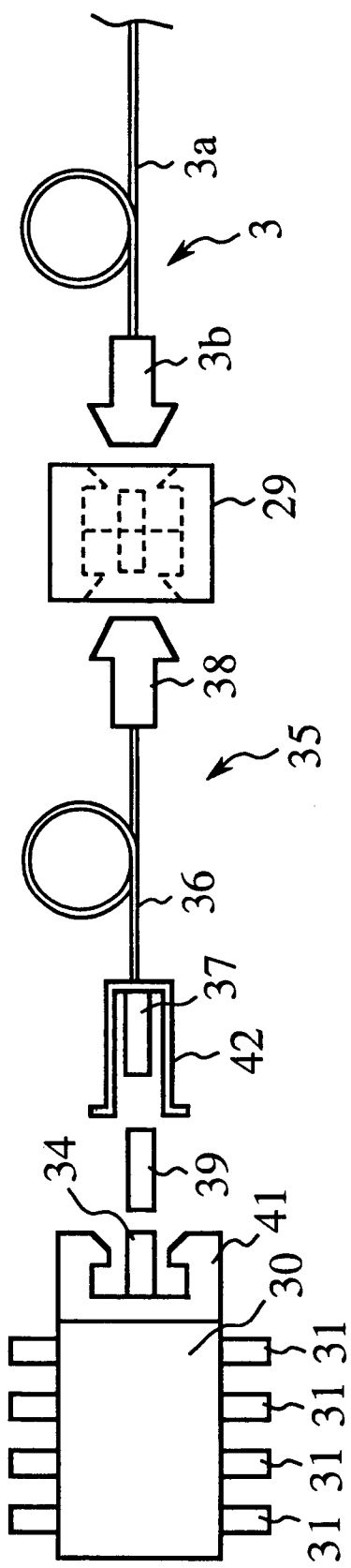
FIG. 18 is a schematic plan view for illustrating the construction of another conventional optical device.

FIG. 14 is a top view of an optical component unit 1 used in an optical device as a seventh preferred embodiment of the present invention. FIG. 15 is a perspective view of a receptacle unit 2 to be combined with the optical component unit 1 shown in FIG. 14. A configuration of the optical device and the process of assembling units and components are same as those of the sixth preferred embodiment with the exception of the follows.

In these figures, the reference numeral 24 denotes through-holes opened through the flanges 21. The reference numeral 25 denotes each of arms with slits 26 to be fit to the respective flanges 21 when the units 1, 2 are combined together. Each of the arms 25 is protruded from the end portion where the ferrule 8 is inserted. The reference numeral 27 denotes protrusions facing toward the inside of the slit 26.

The through-holes 24 may be formed on the flanges 21 by patterning a lead frame (e.g., etching, stamping die) in advance. Also, the package 6 is molded from a molding resin by using a pattern standard of the lead frame, so that an optical reference surface of the tip of the ferrule 8 can be positioned with very high precision if the position of the receptacle unit 2 in the direction of insertion is determined by the through-holes 24 simultaneously formed at the time of patterning the frame. In addition, the optical reference surface of the tip of the ferrule 8 can be in proper alignment with the through-holes 24 with very high precision, resulting that the optical component unit 1 can be in proper alignment with the receptacle unit 2 with very high precision.

According to the seventh preferred embodiment, furthermore, there are the protrusions 27 facing toward the inside of the slit 26, so that the through-holes 24 is formed on the flanges 21 of the optical component unit 1 so as to form the protrusions 27 to be fit into the through holes 24 of the receptacle unit 2 in addition to have a depth of each hole 24 in the direction perpendicular to the insert direction of the receptacle unit 2 against the molded package 6. Therefore, the optical component unit 1 can be in proper alignment with the receptacle unit 2 with very high precision and the advantageous effects described above can be more enhanced.

In particular, the flanges 21 are formed from the lead frame in addition to the formation of the surface-mountable leads 10, and also the through-holes are formed in advance at the time of patterning the lead frame. Thus, the package 6 is molded from a molding resin by using a pattern standard of the lead frame. In addition, the optical reference surface of the tip of the ferrule 8 can be in proper alignment with the through-holes 24 with very high precision. Furthermore, the optical component unit 1 can be in proper alignment with the receptacle unit 2 with very high precision.

As is evident from the above description, we can summarize the advantages of the present invention as follows.

According to the present invention, as described above, a surface-mountable optical device comprises: an optical component unit having a package, an inner optical components installed in the package, a plurality of surface-mountable leads protruded from the package, and a ferrule optically coupled to the inner optical components and protruded from the package in a predetermined direction; and a receptacle unit having a receptacle for holding an optical fiber cable to ensure an optical coupling between the optical fiber cable and the ferrule, and a plurality of surface-mountable leads fixed on the receptacle, wherein the surface-mountable optical device and the receptacle unit are provided independently, and the receptacle unit is inserted into the surface-mountable optical unit along the predetermined direction. With the construction of the surface-mountable optical device, the receptacle unit where the standard plug of optical fiber cable is connected in itself can be fixed on the circuit board. In this case, furthermore, the surface-mountable leads of the receptacle unit are provided for the purpose of only tightly securing the unit on the circuit board, so that a strength of securing the receptacle unit on the circuit board is sufficient to withstand an externally applied force or stress caused by mating or unmating of the standard plug of the optical fiber cable.

Simultaneously with the formation of the receptacle unit, the optical component unit is formed independently, so that the surface-mountable leads that require electric properties are provided-on the optical component unit as optical components and the ferrule are installed on the optical component unit. Thus, the electrical connection between the unit and the board shows the same electrical properties as those of the conventional one.

According to the configuration of the conventional optical device in which the optical components and the receptacle are integrally assembled, the optical device cannot be connected directly to the standard plug of the optical fiber together with the use of the surface-mountable leads. According to the present invention, however, such a problem can be solved by the above construction, so that the surface-mountable leads are used for improving the board density and automatically mounting the optical device and other components on the circuit board at once by the process of reflow. In addition, the direct connection between the standard plug and receptacle unit is used in the optical device to permit a reduction in the required number of components.

According to the present invention, the receptacle unit may be formed to ensure the optical coupling between the optical fiber cable and the ferrule when a space between an outermost surface-mountable lead of the optical component unit on the ferrule side and an outermost surface-mountable lead of the receptacle unit on the optical component unit side, which are adjacent to each other, is an integral multiple of a space between the adjacent surface-mountable leads of the optical component unit. Therefore, a design engineer will easily design a surface-mount pattern of leads of the receptacle unit using general rules for designing leads of the optical component unit or the like. Thus, the optical device of the present invention can be obtained by performing a design for surface-mounting the receptacle unit using the same rules as those of the design for other units or components without using specific design rules.

According to the present invention, the width of the surface mountable lead of the receptacle units may be larger than a width of the surface mountable lead of the optical component unit. Therefore, it enables a lead frame used in the optical component unit or the like to be used for preparing surface-mountable leads and for firmly securing the receptacle unit on the circuit board, resulting in a reduction of an external force or stress that acts on the optical component unit at the time of mating or unmating of the optical fiber cable.

According to the present invention, a length of the surface mountable lead of the receptacle units may smaller than a length of the surface mountable lead of the optical component unit. Therefore, it enables a lead frame used in the optical component unit or the like to be used for preparing surface-mountable leads and for firmly securing the receptacle unit on the circuit board, resulting in the reduction of external force or stress that acts on the surface-mountable leads of the optical component unit at the time of mating or unmating of the optical fiber cable.

According to the present invention, the optical component unit may further comprise at least one guide portion formed from a molding resin and protruded therefrom in the direction coincided with the predetermined direction, for moving the receptacle unit along the guide portion to make an insertion of the receptacle unit into the optical component unit. Therefore, the position of receptacle unit is restricted and stabilized during the insertion into the optical component unit. Thus, the guide portion is responsible for effectively avoiding scratches on the surface of ferrule to be caused by the insertion of receptacle unit or by other works. After insertion, a relative-position error between the receptacle unit and the optical component unit can be reduced, so that the ferrule can be optically coupled to the optical fiber cable with very high precision. In addition, the optical properties of the optical device can be also improved. Furthermore, the guide portion also acts as a protective member of the ferrule when the optical component unit is dropped to the ground by mistake.

According to the present invention, the optical component unit may further comprise at least one guide portion formed from the lead frame and provided thereon in the direction parallel to the predetermined direction, and the receptacle unit may further comprise at least one slit to be fit to the guide portion. Therefore, the position of receptacle unit is restricted and stabilized during the insertion into the optical component unit. Thus, the guide portion is responsible for effectively avoiding scratches on the surface of ferrule to be caused by the insertion of receptacle unit or by other operations.

After insertion, a relative-position error between the receptacle unit and the optical component unit can be reduced, so that the ferrule can be optically coupled to the optical fiber cable with very high precision. In addition, the optical properties of the optical device can be also improved.

According the present invention, one of the optical component unit and the receptacle unit may have at least one recess or through hole being opened in a direction perpendicular to a predetermined direction, while the other of the optical component unit and the receptacle unit may have at least one protrusion at a position facing to the recess or through hole when the receptacle unit is inserted into the optical component unit. Therefore, the optical component unit is more accurately in proper alignment with the receptacle unit, so that the ferrule can be optically coupled to the optical fiber cable with very high precision. Thus, any effects described above can be more increased.

According to the present invention, furthermore, a surface-mountable optical device assembly comprises: a surface-mountable optical device, a circuit board on which the surface-mountable optical device is mounted, and an optical fiber to be optically connected to the surface-mountable optical device, wherein the surface-mountable optical device is comprised of an optical component unit having a package, inner optical components installed in the package, a: plurality of surface-mountable leads protruded from the package, and a ferrule optically coupled to the inner optical components and protruded from the package in a predetermined direction; and a receptacle unit having a receptacle for holding an optical fiber cable to ensure an optical coupling between the optical fiber cable and the ferrule, and a plurality of surface-mountable leads fixed on the receptacle, wherein the surface-mountable optical device and the receptacle unit are provided independently, and. the receptacle unit is inserted into the surface-mountable optical unit along the predetermined direction. Therefore, it produces the same benefits as those of the optical device in accordance with the novel surface-mountable optical device of the present invention.

The present invention has been described in detail with respect to preferred embodiments, and it will now be understood that changes and modifications may be made without departing from the invention in its broader aspects, and it is the intention, therefore, in the appended claims to cover all such changes and modifications as fall within in the true spirit of the invention.

What is claimed is:

1. A surface-mountable optical device comprising:
   an optical component unit having a package, inner optical components installed in the package, a plurality of surface-mountable leads protruded from the package, and a ferrule optically coupled to the inner optical components and protruded from the package in a predetermined direction; and
   a receptacle unit having a receptacle for holding an optical fiber cable to be optically removably connected thereto to ensure an optical coupling between the optical fiber cable and the ferrule, and a plurality of surface-mountable leads fixed on the receptacle, wherein
   the surface-mountable optical device and the receptacle unit are provided independently, and the receptacle unit is connected to the surface-mountable optical unit by movement along the predetermined direction.

2. The surface-mountable optical device according to claim 1, wherein
   a width of surface-mountable leads of the receptacle unit is larger than a width of surface mountable leads of the optical component unit.

3. The surface-mountable optical device according to claim 1, wherein
   a length of surface-mountable leads of the receptacle unit is smaller than a length of surface mountable leads of the optical component unit.

4. The surface-mountable optical device according to claim 1, wherein
   the optical component unit further comprises at least one guide portion protruded from the lead frame in the direction coincided with the predetermined direction, for guiding the receptacle unit along the guide portion to make a connection of the receptacle unit with the optical component unit.

5. The surface-mountable optical device according to claim 1, wherein the optical component unit further comprises at least one guide portion provided on
   the lead frame in the direction parallel to the predetermined direction, and the receptacle unit further comprises at least one slit to be fitted to the guide portion.

6. The surface-mountable optical device according to claim 1, wherein
   one of the optical component unit and the receptacle unit has at least one recess or through hole being opened in the direction perpendicular to the predetermined direction, while the other of the optical component unit and the receptacle unit has at least one protrusion at a position facing to the recess or through hole when the receptacle unit is inserted into the optical component unit.

7. A surface-mountable optical device comprising:

an optical component unit having a package, inner optical components installed in the package, a plurality of surface-mountable leads protruded from the package, and a ferrule optically coupled to the inner optical components and protruded from the package in a predetermined direction; and a receptacle unit having a receptacle for holding an optical fiber cable to ensure an optical coupling between the optical fiber cable and the ferrule, and a plurality of surface-mountable leads fixed on the receptacle, wherein the receptacle unit is formed to ensure the optical coupling between the optical fiber cable and the ferrule when a space between an outermost surface-mountable lead of the optical component unit on the ferrule side and an outermost surface-mountable lead of the receptacle unit on the optical component unit side, which are adjacent to each other, is an integral multiple of a space between the adjacent surface-mountable leads of the optical component unit.

8. A surface-mountable optical device assembly comprising:

a surface-mountable optical device, a circuit board on which the surface-mountable optical device is mounted, and an optical fiber to be optically removably connected to the surface-mountable optical device, wherein the surface-mountable optical device is comprised of:

an optical component unit having a package, inner optical components installed in the package, a plurality of surface-mountable leads protruded from the package, and a ferrule optically coupled to the inner optical components and protruded from the package in a predetermined direction; and a receptacle unit having a receptacle for holding an optical fiber cable removably connected thereto to ensure an optical coupling between the optical fiber cable and the ferrule, and a plurality of surface-mountable leads fixed on the receptacle, wherein the surface-mountable optical device and the receptacle unit are provided independently, and the receptacle unit is connected to the surface-mountable optical unit by movement along the predetermined direction.

9. The surface-mountable optical device according to claim 8, wherein the receptacle unit is formed to ensure the optical coupling between the optical fiber cable and the ferrule when a space between an outermost surface-mountable lead of the optical component unit on the ferrule side and an outermost surface-mountable lead of the receptacle unit on the optical component unit side, which are adjacent to each other, is an integral multiple of a space between the adjacent surface mountable leads of the optical component unit.

10. The surface-mountable optical device according to claim 8, wherein a width of surface-mountable leads of the receptacle unit is larger than a width of surface mountable leads of the optical component unit.

11. The surface-mountable optical device according to claim 8, wherein a length of surface-mountable leads of the receptacle unit is smaller than a length of surface mountable leads of the optical component unit.

12. The surface-mountable optical device according to claim 8, wherein the optical component unit further comprises at least one guide portion protruded from the lead frame in the direction coincided with the predetermined direction, for guiding the receptacle unit along the guide portion to make a connection of the receptacle unit with the optical component unit.

13. The surface-mountable optical device according to claim 8, wherein the optical component unit further comprises at least one guide portion provided on the lead frame in the direction parallel to the predetermined direction, and the receptacle unit further comprises at least one slit to be fitted to the guide portion.

14. The surface-mountable optical device according to claim 8, wherein one of the optical component unit and the receptacle unit has at least one recess or through hole being opened in the direction perpendicular to the predetermined direction, while the other of the optical component unit and the receptacle unit has at least one protrusion at a position facing to the recess or through hole when the receptacle unit is inserted into the optical component unit.

* * * * *